United States Patent Office 2,943,466
Patented July 5, 1960

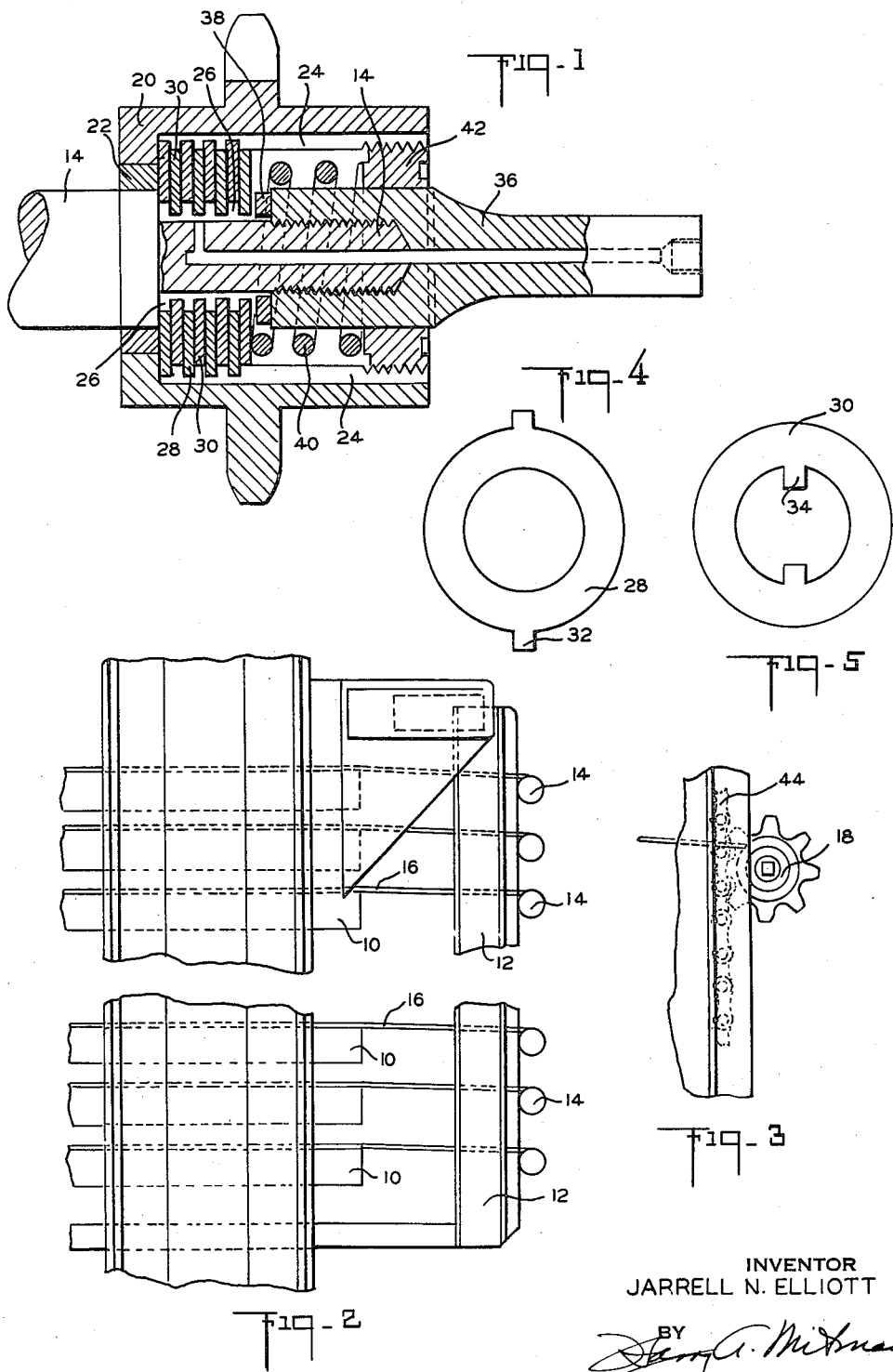

2,943,466
FRICTION CLUTCH SPROCKET

Jarrell N. Elliott, Ukiah, Calif., assignor to Masonite Corporation, Laurel, Miss., a corporation of Delaware
Filed Nov. 25, 1957, Ser. No. 698,861
2 Claims. (Cl. 64—30)

The present invention relates to an improved hydraulic press mechanism. More particularly, in a multi-platen hydraulic press adapted for charging and discharging flat sheet articles, the invention relates to an improved friction clutch sprocket assembly.

In the manufacture of lignocellulose hardboard, wet fibrous laps are ordinarily supported on wire screens as they are charged to the several press openings. The wire screens also serve to permit the escape of water and steam from the laps during their consolidation. Thereafter, the screens convey the consolidated sheets out of the press openings. Generally, the wire screens have been wound on rollers upon moving out of the press openings. The free ends thereof are attached to cables which extend through the press openings and are attached to drums upon which they are wound as the wire screens are pulled into the press openings. Both the rollers and drums are provided with shafts carrying sprockets which are chain driven to move the screens into and out of the press openings. Such an apparatus is described in U. S. Patent No. 1,903,222 to Mason, issued March 28, 1933. The present invention relates to an improved sprocket assembly for use in the patented, or in similar, pressing apparatus.

A primary object of the invention resides in the provision of a friction clutch sprocket assembly which permits stopping the press screens in the desired position when unloading the press. This eliminates the necessity of manually aligning the screens prior to a subsequent press loading operation.

Another object of the invention is the prevention of tearing the wire screens and breaking the cables when discharging hardboard sheets from the press.

A further object resides in the prevention of water spots on the hardboard surfaces during the press-unloading operation. Other objects of the invention will become apparent from the following detailed description thereof.

The invention will be described with particular reference to the accompanying drawings in which Fig. 1 is a longitudinal sectional view through the center of the friction clutch sprocket assembly.

Fig. 2 is a partial side elevation of a multi-platen hydraulic press illustrating several of the platens and press screens, Fig. 3 is an enlarged view of a single sprocket illustrating the chain driving means therefor, Fig. 4 is a top plan view of a drive disc, and Fig. 5 is a top plan view of a clutch disc.

The press as ordinarily constructed comprises an uppermost, fixed, horizontal platen (not shown), and a number of movable horizontal platens 10, for example twenty. A movable vertical frame 12 extends in front of the press and supports a number of rollers 14 on which are wound the press screens 16. The shafts of the rollers 14 are journaled in brackets (not shown), and one end of each roller shaft is provided with a sprocket assembly 18 as shown in Fig. 3.

Sprocket housing 20 is fitted with a bushing 22 into which the roller shaft 14 is journaled. The housing 20 contains the oppositely positioned keyways 24 extending longitudinally therethrough. The roller shaft 14 contains the oppositely positioned longitudinally extending keyways 26. The drive discs 28 and clutch or driven discs 30 are slipped over the shaft 14 and are alternately arranged (as shown in Fig. 1) with their respective keys 32 and 34 extending into the keyways 24 and 26. The shaft extension 36 is threaded onto the shaft 14 and locked in position by the lock washer 38. Spring 40 is positioned against the lowermost disc 30 and is held by the nut 42 threaded into the housing 20. Torque is applied to the discs by the spring 40 as the nut 42 is tightened.

In operation the chain 44, which is driven by conventional means not shown, engages the sprockets 18 causing them to revolve. The discs 28 are thereby caused to rotate and, as a result of the friction resulting from the torque applied thereto by spring 40, the discs 30 are also rotated. This results in the rotation of shaft 14 whereby the wire screen 16 is moved either into or out of its press opening. If the load should become greater than the torque involved, usually about 40 pounds, the clutch discs 30 are caused to slip, thereby enabling the shaft 14 and screen 16 to stop. The sprocket 18 will, in effect, idle without breakage of screen or cable. In like manner, should any screen reach its terminal point of travel prior to any other screen, the sprocket driving it is enabled to idle without applying additional strain to either the wire or its cable.

Thus it will be appreciated that the present invention presents a novel and greatly improved sprocket assembly useful in the operation of multi-platen presses. The novel sprocket not only prevents the tearing of the press screens and breaking of the cables attached thereto, but also eliminates one member of the press crew.

The assembly shown and described illustrates the preferred embodiment of the invention. It is to be understood, however, that the invention includes such modifications as lie within the skill of the art and the invention shall be limted only by the breadth of the appended claims.

I claim:

1. A friction clutch sprocket assembly comprising in combination a sprocket-carrying housing together with a centrally disposed shaft extending therethrough, alternately arranged drive and driven friction discs positioned over said shaft, each of said driven friction discs carrying a pair of opposed centrally-extending projections adapted to engage corresponding keyways in said shaft, each of said drive friction discs carrying a pair of opposed outwardly-extending projections adapted to engage corresponding keyways in the inner surface of said housing, a threaded plug engaging threads in the inner surface of said housing, and a compressible coil spring positioned around said shaft between said friction discs and said threaded plug, said plug adapted to apply torque to said discs by means of said coil spring.

2. A friction clutch sprocket assembly comprising the combination of a sprocket-carrying housing, a centrally disposed shaft extending therethrough, alternately arranged drive and driven friction discs positioned over said shaft and engaging, respectively, keyways in said housing and said shaft, an adjustable threaded plug engaging mating threads in the inner surface of said housing, and a compressible coil spring positioned around said shaft between said friction discs and said plug, said plug adapted to apply torque to said friction discs by means of said coil spring.

References Cited in the file of this patent

UNITED STATES PATENTS

| | | |
|---|---|---|
| 499,183 | Dahl | June 6, 1893 |
| 2,727,372 | Haerther | Dec. 20, 1955 |

FOREIGN PATENTS

| | | |
|---|---|---|
| 106,171 | Great Britain | May 17, 1917 |
| 807,874 | Germany | Apr. 26, 1951 |